United States Patent
Sethi et al.

(10) Patent No.: US 12,309,131 B2
(45) Date of Patent: May 20, 2025

(54) METHOD AND SYSTEM FOR USER AUTHENTICATION DURING DATA MIGRATION

(71) Applicant: Dell Products L.P., Round Rock, TX (US)

(72) Inventors: Parminder Singh Sethi, Ludhiana (IN); Anay Kishore, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 265 days.

(21) Appl. No.: 18/192,758

(22) Filed: Mar. 30, 2023

(65) Prior Publication Data
US 2024/0333697 A1    Oct. 3, 2024

(51) Int. Cl.
*H04L 29/06*      (2006.01)
*H04L 9/40*       (2022.01)

(52) U.S. Cl.
CPC .......... *H04L 63/08* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 10,048,996 B1 | 8/2018 | Bell et al. | |
| 12,034,740 B1 * | 7/2024 | Carmack | H04L 63/1416 |
| 2007/0005985 A1 * | 1/2007 | Eldar | G06Q 20/3674 |
| | | | 713/183 |
| 2010/0250508 A1 * | 9/2010 | Erofeev | G06F 16/1744 |
| | | | 707/704 |
| 2015/0189124 A1 * | 7/2015 | Mondo | H04L 67/306 |
| | | | 358/1.14 |
| 2016/0154690 A1 | 6/2016 | Horrell | |
| 2018/0143880 A1 | 5/2018 | Dornemann | |
| 2019/0332496 A1 | 10/2019 | Chopra | |
| 2020/0019465 A1 | 1/2020 | Khan | |
| 2022/0108167 A1 | 4/2022 | Upadhyay | |
| 2024/0028387 A1 | 1/2024 | Sethi | |
| 2024/0098003 A1 * | 3/2024 | Hernandez Cortinas | |
| | | | H04L 63/1425 |

FOREIGN PATENT DOCUMENTS

| | | | |
|---|---|---|---|
| CN | 106332054 A * | 1/2017 | |
| WO | 2006002071 A2 | 1/2006 | |
| WO | 2023174550 A1 | 9/2023 | |

OTHER PUBLICATIONS

Ganguly et al, A Practical Approach to Hard Disk Failure Prediction in Cloud Platforms: Big Data Model for Failure Management in Datacenters, 2016 (12 pages).

* cited by examiner

*Primary Examiner* — Benjamin E Lanier
(74) *Attorney, Agent, or Firm* — Chamberlain, Hrdlicka, White, Williams & Aughtry; Aly Z. Dossa

(57) ABSTRACT

A method for performing a data migration operation includes scanning a target device to determine user accounts on the target device. The method also includes migrating data from a source device to the target device and monitoring user authentications of the user accounts on the target device while migrating data from the source device to the target device. Further, the method includes making a determination that a number of user authentications made while migrating data exceeds a threshold value, and stopping, based on the determination, migrating data from the source device to the target device.

18 Claims, 4 Drawing Sheets

METHOD AND SYSTEM FOR USER AUTHENTICATION DURING DATA MIGRATION

BACKGROUND

Computing devices may provide services. To provide the services, the computing devices may include hardware components and software components. The software components may store information usable to provide the services using the hardware components. From time-to-time, data may be migrated from one device to another device. Such migrating may present an opportunity for a bad actor to perform inappropriate actions on the data being migrated.

SUMMARY

In general, embodiments described herein relate to a method for performing a data migration operation, the method includes scanning a target device to determine user accounts on the target device. The method also includes migrating data from a source device to the target device and monitoring user authentications of the user accounts on the target device while migrating data from the source device to the target device. Further, the method includes making a determination that a number of user authentications made while migrating data exceeds a threshold value, and stopping, based on the determination, migrating data from the source device to the target device.

In general, embodiments described herein relate to a method for performing a data migration operation, the method includes scanning a target device to determine user accounts on the target device and migrating data from a source device to the target device. The method also includes monitoring user authentications of the user accounts on the target device while migrating data from the source device to the target device to obtain user authentication information. Further, the method includes making a determination that the user authentication information is indicative of suspicious activity, and stopping, based on the determination, migrating data from the source device to the target device.

In general, embodiments described herein relate to a method for performing a data migration operation, the method includes migrating data from the source device to the target device and monitoring the target device while migrating data. The method also includes making a determination, based on the monitoring, that suspicious activity has occurred on the target device, and performing, based on the determination, an action from an action set.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

DETAILED DESCRIPTION

Figure 1:
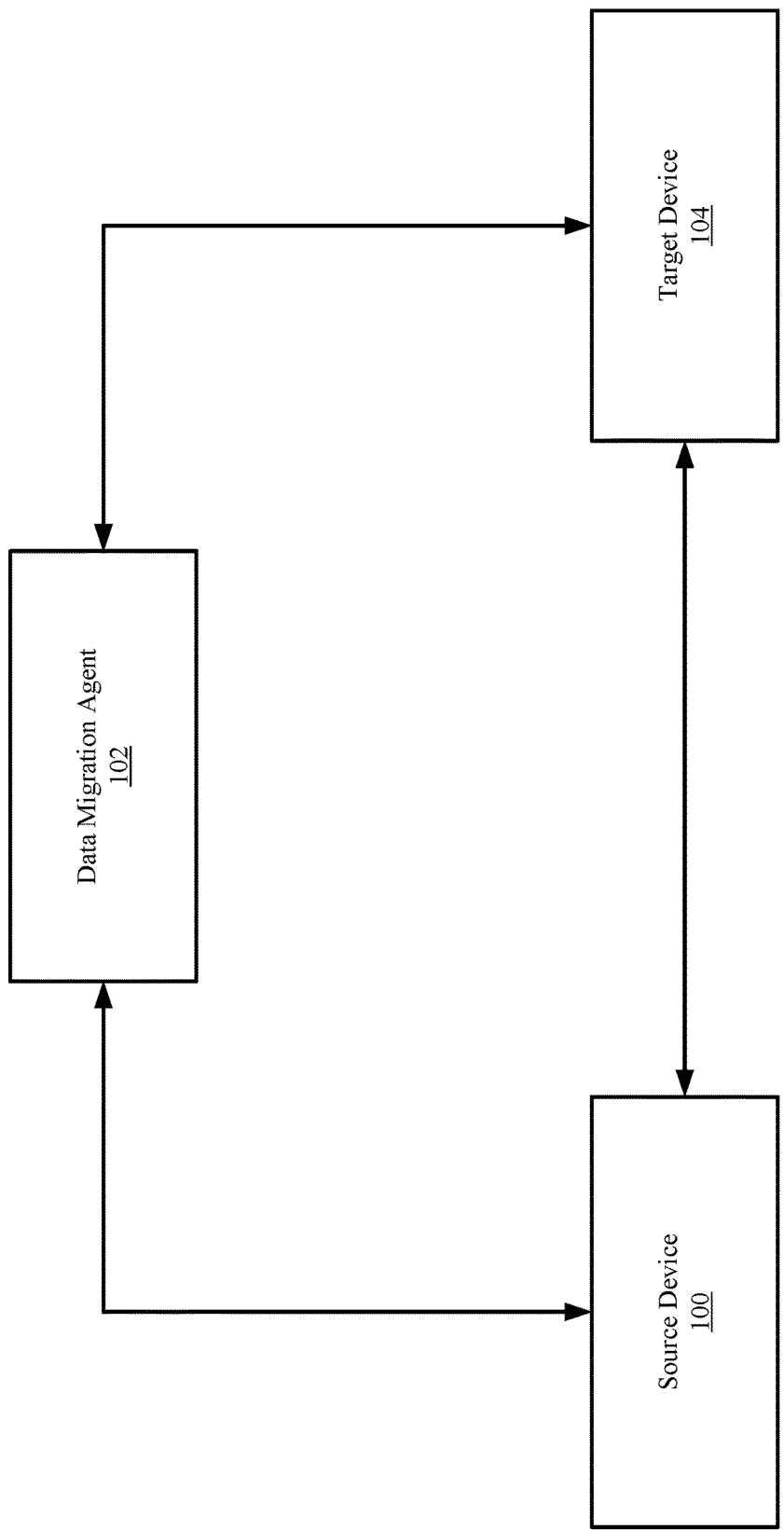
FIG. 1 shows a diagram of a system in accordance with one or more embodiments.

In the below description, numerous details are set forth as examples of embodiments described herein. It will be understood by those skilled in the art, and having the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments described herein relate to methods, systems and non-transitory computer readable mediums storing instructions for creating and executing data migration operations from one device or set of devices to another device or set of devices (e.g., from one computing environment to another). In one or more embodiments, migration operations include providing additional security during the data migration operation.

In one or more embodiments, a data migration agent may be included to monitor a data migration operation. The data migration agent may identify a source device and a target device, where the source device is intending to migrate data to the target device. The data migration agent may scan the target device to identify all user accounts on the target device and details regarding the target device. In response, the data migration agent may determine that there is a risk present on the target device and pause the data migration operation until the risk is resolved, or the data migration agent may determine that there is not a risk present and allow data to begin migrating from the source device to the target device. Further, the data migration agent may monitor the target device during the migration of data to the target device. If the data migration agent detects any suspicious activity, as described in detail below, the data migration agent may perform a security operation to reduce any risk presented to the data being migrated. Doing so may increase the security provided for the data being migrated during a data migration operation, thereby reducing the ability of a bad actor to perform actions on data.

The following describes various embodiments of the invention.

FIG. 1 shows a diagram of a system in accordance with one or more embodiments described herein. The system may include any number of source device(s) (100) and any number of target device(s) (104). The system may also include a data migration agent (102) operatively connected to the source device (100) and to the target device (104). Each of these components is described below.

In one or more embodiments, the source device (100) and the target device (104) may be computing devices. Such computing devices may be referred to as endpoints. In one or more embodiments, an endpoint is any computing device, collection of computing devices, portion of one or more computing devices, or any other logical grouping of computing resources. In one or more embodiments, the source device (100) may collectively be referred to as a source environment. Similarly, in one or more embodiments, target device (104) may collectively be referred to as a target environment.

In one or more embodiments, the system also includes the data migration agent (102). In one or more embodiments, the data migration agent (102) is operatively connected to both the source device (100) and the target device (104). The data migration agent (102) may be located within a source environment, within a target environment, or separate from and connected to both environments.

In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fiber channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device. Other types of computing devices may be used without departing from the scope of the invention. In one or more embodiments, a set of computing devices may form all or a portion of a data domain, all, or part of which may require migrating from time to time (e.g., upon request and/or pursuant to a defined schedule). In one or more embodiments, a data domain is any set of computing devices for which data migration operations are performed.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, a computing device includes and/or is operatively connected to any number of storage volumes (not shown). In one or more embodiments, a volume is a logically accessible storage element of a computing system. A volume may be part of one or more disk drives, and may or may not include any number of partitions. In one or more embodiments, a volume stores information relevant to the operation and/or accessible data of a computing device. In one or more embodiments, a volume may be all or part of any type of computing device storage (described above).

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

Alternatively, in one or more embodiments, the data migration agent (102) may be implemented as a logical device. The logical device may utilize the computing resources of any number of computing devices to provide the functionality of the data center described throughout this application.

In one or more embodiments, the source device (100), the data migration agent (102), and/or the target device (104) are operatively connected via a network (not shown). In one or more embodiments, the network may represent a computing network configured for computing resource and/or messages exchange among registered computing hosts (e.g., the source device (100), the data migration agent (102), and/or the target device (104), etc.). As discussed above, components of the system may operatively connect to one another through the network (e.g., a LAN, a WAN, a mobile network, a wireless LAN (WLAN), etc.). In one or more embodiments, the network may be implemented using any combination of wired and/or wireless network topologies, and the network may be operably connected to the Internet or other networks. Further, the network may enable interactions between the source device (100), the data migration agent (102), and/or the target device (104) through any number and types of wired and/or wireless network protocols (e.g., TCP, UDP, Internet Protocol version 4 (IPv4), etc.).

While FIG. 1 shows a configuration of components, other configurations may be used without departing from the scope of embodiments described herein. Accordingly, embodiments disclosed herein should not be limited to the configuration of components shown in FIG. 1.

Figure 2:
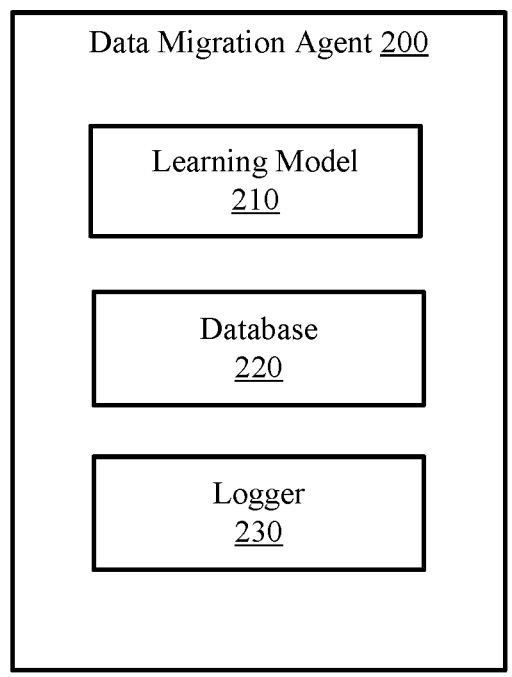
FIG. 2 shows a diagram of a data migration agent in accordance with one or more embodiments.

Turning now to FIG. 2, FIG. 2 shows a diagram of a data migration agent (200) in accordance with one or more embodiments. The data migration agent (200) is be an example of the data migration agent (e.g., 104) discussed above in reference to FIG. 1. The data migration agent (200) may include a learning model (210), a database (220), and a logger (230). The data migration agent (200) may include additional, fewer, and/or different components without departing from the scope of the invention. Each component may be operably connected to any of the other components via any combination of wired and/or wireless connections. Each component illustrated in FIG. 2 is discussed below.

In one or more embodiments, the learning model (210) may include functionality to (i) scan target devices for unused user accounts; (ii) monitor authentication (e.g., including authorization) requests on the target devices; (iii) monitor activities performed by user accounts, such as non-admin accounts and/or non-root user accounts; (iv) monitor creation of new user accounts; (v) track system access request failures; and (vi) identify threats and/or suspicious activities based on policies (e.g., user-defined policies). Further, the learning model (210) may initially be based on user-defined thresholds and policies. Over time, the learning model may be updated periodically and may define new thresholds and policies. As such, the learning model may utilize historical data to adjust and/or improve its ability to perform the above functionality.

In one or more embodiments, the learning model (210) may be any model capable of producing a result (e.g., a prediction) based on a set of input data. The model may include any supervised model, unsupervised model, transformer model, reinforcement model, semi-supervised learning model, self-supervised learning model, multi-instance learning model, inductive learning model, deductive inference learning model, transductive learning model, multi-task learning model, active learning model, online learning model, transfer learning model, ensemble learning model, or any other learning model.

One of ordinary skill will appreciate that the learning model (210) may perform other functionalities without departing from the scope of the invention. When providing its functionalities, the learning model (210) may perform all, or a portion, of the methods illustrated in FIG. 3. The learning model (210) may be implemented using hardware, software, or any combination thereof.

In one or more embodiments, the database (220) may be a fully managed, local, and lightweight database (or any logical container such as SQLite database) that acts as a shared storage or memory resource (discussed above) that is functional to store unstructured and/or structured data. Further, the database (220) may also occupy a portion of a physical storage/memory device or, alternatively, may span across multiple physical storage/memory devices.

In one or more embodiments, the database (220) may be implemented using physical devices that provide data storage services (e.g., storing data and providing copies of previously stored data). The devices that provide data storage services may include hardware devices and/or logical devices. For example, the database (220) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (220) may include a memory device (e.g., a dual in-line memory device), in which data is stored and from which copies of previously stored data are provided. As yet another example, the database (220) may include a persistent storage device (e.g., an SSD), in which data is stored and from which copies of previously stored data is provided. As yet another example, the database (220) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (220) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (220) may store (temporarily or permanently) unstructured and/or structured data that may include (or specify), for example (but not limited to): details of web services, applications, database services, hardware, active sessions and/or migration operations on the source device and/or the target device, one or more policies (e.g., imported from an active directory, domain controller, and/or set by users) and/or rules for the operation (or configuration) of any portion of the learning model (210), configuration parameters, details of other application instances deployed at different sites, details of earlier active socket connections that are presently closed, details of currently active socket connections, details of previously rejected requests (e.g., due to credential mismatches or timeouts), block lists of malicious machines (e.g., lists maintained by a user, lists of machines sending invalid requests, etc.), details of secure upload servers to which any information stored in the database (220) may be sent, cleanup schedules for the database (220), information regarding the risk level of data stored in the source device, a profile of a valid user, a profile of an invalid user, one or more outputs of the processes performed by the learning model (210), recently obtained user information (e.g., records, credentials, etc.) of a user, a port's user guide, a port's release note, a user posted approximated port activation time, a model name of a hardware component, a serial number of a computing device, a hardware identification (ID) number of a hardware component, an identifier of a computing device's manufacturer, a setting of an application, a version of an application, a product identifier of an application, etc.

In one or more embodiments, the configuration parameters may specify (or include), for example (but not limited to): locations of applications at different sites, hardware, application, and/or database inventory details of a the source device, filter policies for device scans and monitoring, steps to take (e.g., based on pre-defined option from which a user may select, user-defined steps, etc.) when the data migration agent (200) identifies a suspicious user account and/or foreign actor, details of different data migration agents with which the data migration agent (200) may share data, reporting console setting, etc.

In one or more embodiments, during the deployment of the data migration agent (200), an administrator of the data migration agent (200) may directly provide the configuration parameters (which may be configured directly), or the configuration parameters may be imported by the administrator in the form of, for example, an extensible markup language (XML) file or JavaScript object notation (JSON) file.

In one or more embodiments, the database (220) may provide an indexing service. More specifically, an agent of the database (220) may receive various data authentication related inputs directly from, for example, the learning model (210). Upon receiving, the agent may analyze those inputs to generate an index(es) (e.g., a data authentication index(es)) for optimizing the performance of the database (220) by reducing a required amount of database access(es) when implementing a request (e.g., a data retrieval request). In this manner, requested data may be quickly located and accessed from the database (220) using an index of the requested data. In one or more embodiments, an index may refer to a database structure that is defined by one or more field expressions. A field expression may be a single field name such as "user_number". For example, an index (e.g., E41295) may be associated with "user_name" (e.g., Adam Smith) and "user_number" (e.g., 012345), in which the requested data is "Adam Smith 012345".

Further, in one or more embodiments, an index may include, for example (but not limited to): information about a valid user associated with a data migration operation. The index(es) may also include other information that may be used to efficiently identify historical data replication operations. In one or more embodiments, the aforementioned data may be stored as "data migration operation metadata" in the database (220.

In one or more embodiments, the unstructured and/or structured data may be updated (automatically) by third party systems (e.g., platforms, marketplaces, etc.) (provided by vendors) or by administrators based on, for example, newer (e.g., updated) versions of configuration parameters being available. The unstructured and/or structured data may also be updated when, for example (but not limited to): a different type of attack is captured for data access, a new response ruleset is generated, a new request ruleset is generated, etc.

In one or more embodiments, the unstructured and/or structured data may be maintained by, for example, the learning model (210). The learning model (210) may add, remove, and/or modify those data in the database (220) to cause the information included in the database (220) to reflect the latest version of, for example, configuration parameters. The unstructured and/or structured data available in the database (220) may be implemented using, for example, lists, tables, unstructured data, structured data, etc. While described as being stored locally, the unstructured and/or structured data may be stored remotely, and may be distributed across any number of devices without departing from the scope of the invention.

While the database (220) has been illustrated and described as including a limited number and type of data, the database (220) may store additional, less, and/or different data without departing from the scope of the invention.

One of ordinary skill will appreciate that the database (220) may perform other functionalities without departing from the scope of the invention. When providing its functionalities, the database (220) may perform all, or a portion, of the method illustrated in FIG. 3. The database (220) may be implemented using hardware, software, or any combination thereof.

In one or more embodiments, the logger (230) may be a shared storage or memory resource (discussed above) that is functional to store unstructured and/or structured data. Further, the logger (230) may also occupy a portion of a physical storage/memory device or, alternatively, may span across multiple physical storage/memory devices.

In one or more embodiments, the logger (230) may be implemented using physical devices that provide data storage services. The devices that provide data storage services may include hardware devices and/or logical devices. For example, the logger (230) may include any quantity and/or combination of memory devices, long-term storage devices, other types of hardware devices that may provide short-term and/or long-term data storage services, and/or logical storage devices (e.g., virtual persistent storage/virtual volatile storage).

For example, the logger (230) may include a memory device (e.g., a dual in-line memory device), in which data is stored and from which copies of previously stored data are provided. As yet another example, the logger (230) may include a persistent storage device (e.g., an SSD), in which data is stored and from which copies of previously stored data is provided. As yet another example, the logger (230) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the logger (230) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or another hardware device that allocates storage resources of the physical storage devices.

In one or more embodiments, the logger (230) may store/log/record (temporarily or permanently, in conjunction with the database (220), and based on the log level configuration set by an administrator of the data center (e.g., 110, 120, etc., FIG. 1)) unstructured and/or structured data that may include (or specify), for example (but not limited to): a valid (e.g., a granted) request and its corresponding details, an invalid (e.g., a rejected) request and its corresponding details, one or more details (e.g., content of the transmitted data packets, information regarding a targeted destination, etc.) of a recently initiated data migration operation, one or more details (e.g., content of the intercepted data packets, information regarding the sender (e.g., a high priority trusted user, a low priority trusted user, etc.), information regarding the size of intercepted data packets, etc.) of an incoming request/call/network traffic, one or more details (e.g., content of the outgoing data packets, information regarding a targeted destination, information regarding the size of outgoing data packets, etc.) of an outgoing request/call/network traffic, a mapping table that shows the mappings between an incoming request/call/network traffic and an outgoing request/call/network traffic, a data migration operation history documentation of a valid user, recently obtained user activity records, a cumulative history of user activity records obtained over a prolonged period of time, a cumulative history of network traffic logs obtained over a prolonged period of time, previously received malicious data access requests from an invalid user, previously received malicious data migration requests from an invalid user, backup history documentation of a workload, a documentation that indicates a set of jobs (e.g., a data migration job, etc.) that has been initiated, a documentation that indicates a status of a job (e.g., how many jobs are still active, how many jobs are completed, etc.), a cumulative history of initiated data migration operations (e.g., sessions) over a prolonged period of time, a cumulative history of initiated data migration operations over a prolonged period of time, any changes to configuration parameters (as well as the relevant parties and information associated with such changes, in which the changes may be result of changes made by an administrator or via administrative systems), details of data objects that do not match the corresponding configuration parameters (in this manner, the logged details may be used to audit a user, incoming network traffic, and/or outgoing network traffic), etc. Based on the aforementioned data, for example, the learning model (210) may perform user analytics to infer the profile of users communicating with the corresponding devices (e.g., 102, 104, etc. FIG. 1).

In one or more embodiments, data logged by the logger (230) may be registered. That is, the data may be indexed or otherwise associated with registration records. A registration record may be a data structure that includes information that enables the logged data to be accessed. For example, a registration record may include an identifier associated with the data. A registration record may include different, additional, and/or less information for access the data without departing from the scope of the invention. When the logger (230) stores data in itself, the logger (230) may provide a corresponding registration record to the database (220). The database (220) may utilize the aforementioned registration record to notify other entities of the existence of the data and/or to facilitate access to the data in the future.

In one or more embodiments, the unstructured and/or structured data may be maintained by, for example, the learning model (210). The learning model (210) may add, remove, and/or modify those data in the logger (230) to cause the information included in the logger (230) to reflect the latest version of, for example, configuration parameters. The unstructured and/or structured data available in the logger (230) may be implemented using, for example, lists, tables, unstructured data, structured data, etc. While described as being stored locally, the unstructured and/or structured data may be stored remotely, and may be distributed across any number of devices without departing from the scope.

While the logger (230) has been illustrated and described as including a limited number and type of data, the logger (230) may store additional, less, and/or different data without departing from the scope.

One of ordinary skill will appreciate that the logger (230) may perform other functionalities without departing from the scope of the invention. When providing its functionalities, the logger (230) may perform all, or a portion, of the method illustrated in FIG. 3. The logger (230) may be implemented using hardware, software, or any combination thereof.

Figure 3:
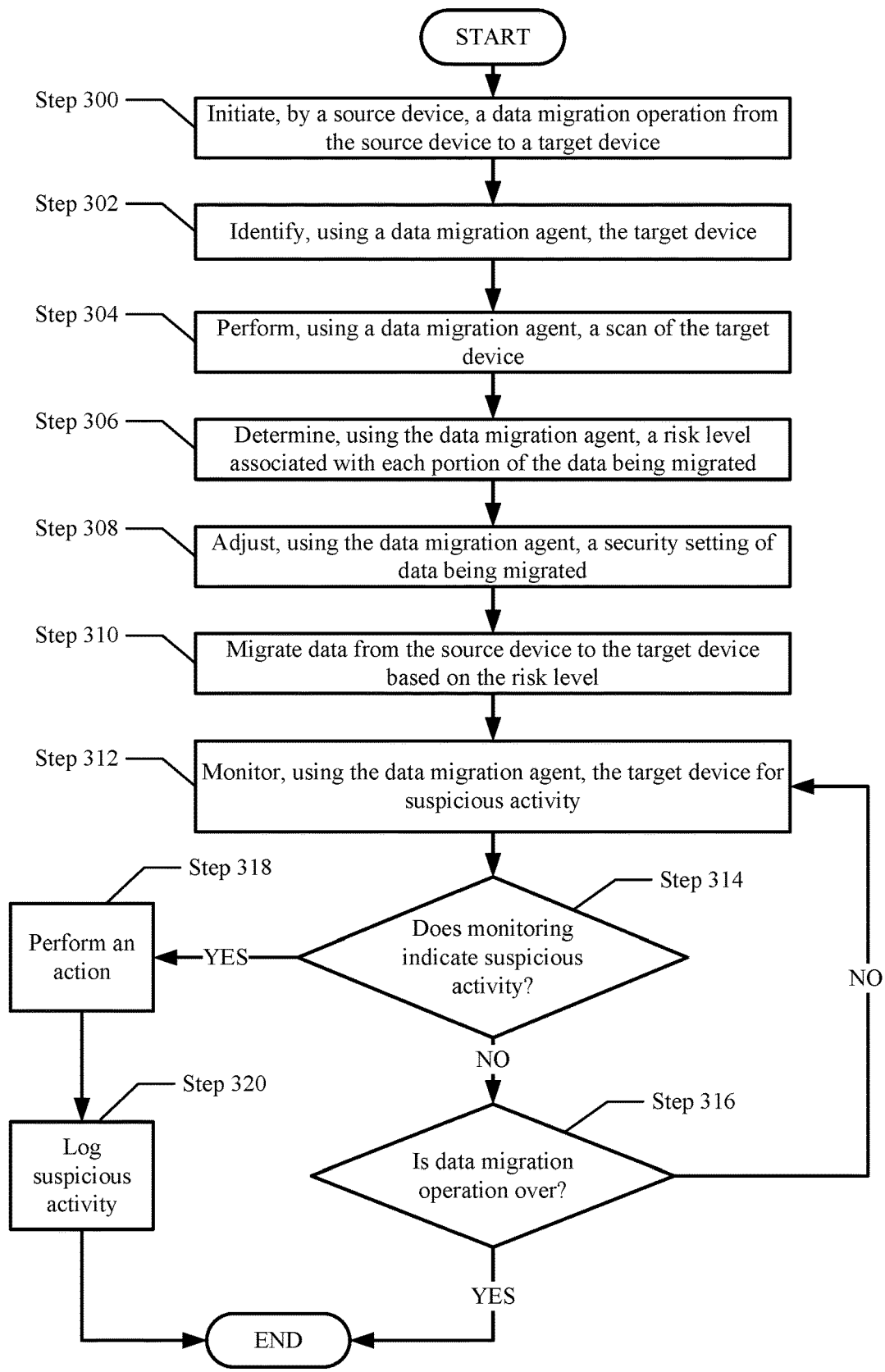
FIG. 3 shows a method for providing a secure data migration operation in accordance with one or more embodiments.

FIG. 3 shows a method for secure data migration from a source device to a target device in accordance with one or more embodiments. While various steps in the method are presented and described sequentially, those skilled in the art will appreciate that some or all of the steps may be executed in different orders, may be combined or omitted, and some or all steps may be executed in parallel without departing from the scope of the invention.

The method shown in FIG. 3 may provide enhanced data security when conducting a data migration operation. Further, applying the method across a large set of users can provide a large data set that includes how bad actors attempt to infiltrate computer systems. The data set may then be used to update a learning model (e.g., learning model (220), FIG. 2), which may enable the learning model to identify a greater amount of suspicious activity during a data migration operation. Further, users of the relevant computer systems may be provided increased information regarding what specific user accounts and activities of the user accounts led to a determination of suspicious activity.

Turning now to FIG. 3, the method shown in FIG. 3 may be executed by, for example, the above-discussed data migration agent (e.g., 200, FIG. 2). Other components of the system illustrated in FIG. 1 may also execute all or part of the method shown in FIG. 3 without departing from the scope.

In Step 300, a source device (e.g., source device (100), FIG. 1) initiates a data migration operation from the source device to a target device (e.g., (104), FIG. 1).

In Step 302, the data migration agent (e.g., (102), FIG. 1) identifies the target device. In one embodiment, the target device may be identified by receiving a specific target device information from the source device. In one embodiment, the data migration agent identifies the target device based on criteria sent to the data migration agent from the source device.

In Step 304, the data migration agent performs a scan of the target device. The scan identifies all of the user accounts on the target device. To do so, in one embodiment, the data migration agent sends a script to the target device that runs locally on the target device. The script then scans the target device to identify any unused user account (e.g., accounts created during development, testing, deployment, etc.), active user accounts, and any other user account. The script may also identify information about each account, including level of access, a timestamp of each time the account has been accessed, etc. The results of the scan are then sent to the data migration agent.

If the scan indicates that there are unused user accounts on the target device, the data migration agent may send a warning to the source device, or another designated device indicating that there is at least one unused user account on the target device. The notification may further include additional information related to the user account, such as information specifying which user account has been identified, the level of access related to the user account, the most recent time the user account was accessed, or any other information relating to user accounts disclosed herein. Further, in one embodiment, in addition to/alternatively to sending the notification, the data migration agent pauses initiation of the data migration operation between the source device and the target device. In one embodiment, the user may then override the pause and force the data migration to continue. In one embodiment, the user may perform an action to remove the threat of the unused user account and send a second notification to the data migration agent indicating that the unused user account is no longer a threat. In one embodiment, in response to the second notification, the data migration resumes initiation of the data migration operation. In another embodiment, in response to the second notification, the data migration re-scans the target device to identify any unused user accounts.

If the results of the scan indicate that there are no unused user accounts on the target device, the data migration agent may send the results to the source device and allow the data migration operation to continue.

In Step 306, the data migration agent determines a risk level associated with each portion of the data being migrated. The data migration agent may identify any number of risk levels, including a first risk level, a second risk level, a third risk level, etc. Further, the risk level may indicate a criticality, a priority, and/or a value of the associated data. Determining the risk level may be based on any combination of characteristics and/or metadata associated with the data.

In Step 308, the data migration agent adjusts security setting of the data being migrated. In one embodiment, the data migration agent may lock access to only read and write capabilities to the data while the data migration operation is ongoing. Further, the data migration agent may only allow the socket and/or process involved in the data migration operation to have access to the data.

In Step 310, the data is migrated from the source device to the target device. The order that the data is migrated may be random or be based on file size, date of last use, or any other metadata relating to the data. In one embodiment, the data is migrated based on the risk level. For example, the data with the lowest risk level may be sent first, then the data with the next lowest risk level may be sent, and so on. By migrating the data based on a risk level, if a bad actor is able to perform an action on the data being migrated, the bad actor is more likely to perform an action on only data having a lower risk level.

In Step 312, the data migration agent monitors the target device for suspicious activity. The monitoring may include monitoring any addition user authentications (e.g., login events or attempted login events) on the target device. Further, the monitoring may include determining whether the user authentication is happening from a local account or a foreign (i.e., not local) account. The monitoring may also include monitoring all activities performed on the data being migrated, including, for example, an activity to adjust a security setting of the data, an attempt to copy the data, etc.

In Step 314, the data migration agent determines if any of the monitoring is indicative of suspicious activity. Accordingly, in one or more embodiments, if the result of the determination is YES, the method proceeds to Step 318. If the result of the determination is NO, the method alternatively proceeds to Step 316.

In one or more embodiments, the determination may be based on a number of user authentications occurring during the migration operation, whether the user authentication is happening from a local account or a foreign (i.e., not local) account and/or activities performed on the data being migrated, including, for example, an activity to adjust a security setting of the data, an attempt to copy the data, etc. For example, if the number of user authentications that occur during the migration operation is above a threshold value, then the determination made in Step 314 is YES. Further, the determination may be based on which user account is performing which access. For example, a user account with admin access performing an action is determined not to be suspicious, but a user account without admin access performing the same action is determined to be suspicious.

In Step 316, as a result of the determination made in Step 314 being NO, the data migration agent determines whether the data migration operation is over. If the data migration agent determines that the data migration operation is still ongoing (NO), the method returns to Step 312. If the data migration agent determines that the data migration operation is over (YES), then the method may end following Step 316.

In Step 318, as a result of the determination made in Step 314 being YES, the data migration agent performs an action from an action set. In one or more embodiments, the action set includes stopping the migration operation, rolling back the migration operation (i.e., migrating the data back to the source device from the target device), and sending a notification to a user that suspicious activity has been identified along with the information pertaining to the suspicious activity.

In one embodiment, the action set also includes allowing migration to continue for data associated with a risk level below a threshold value and blocking migration for data associated with a risk level above the threshold value. In this embodiment, the user may perform an action to mitigate and/or eliminate the threat posed by the suspicious activity and send a second notification to the data migration agent. The data migration agent may receive the second notification and continue the data migration operation for data associated with all risk levels. Further, in one or more embodiments, the action may include any combination of the items in the action set.

In Step 320, the data migration agent logs the suspicious activity. The logs of the suspicious activity may be utilized to update a learning model (e.g., (210), FIG. 2). As discussed above, the learning model may be used in Steps 312 and 314. Updating the learning model may adjust one or more of the conditions that would cause the data migration agent to determine that the monitoring is indicative of suspicious activity.

The method may return to Step 312 or end following Step 320.

Figure 4:
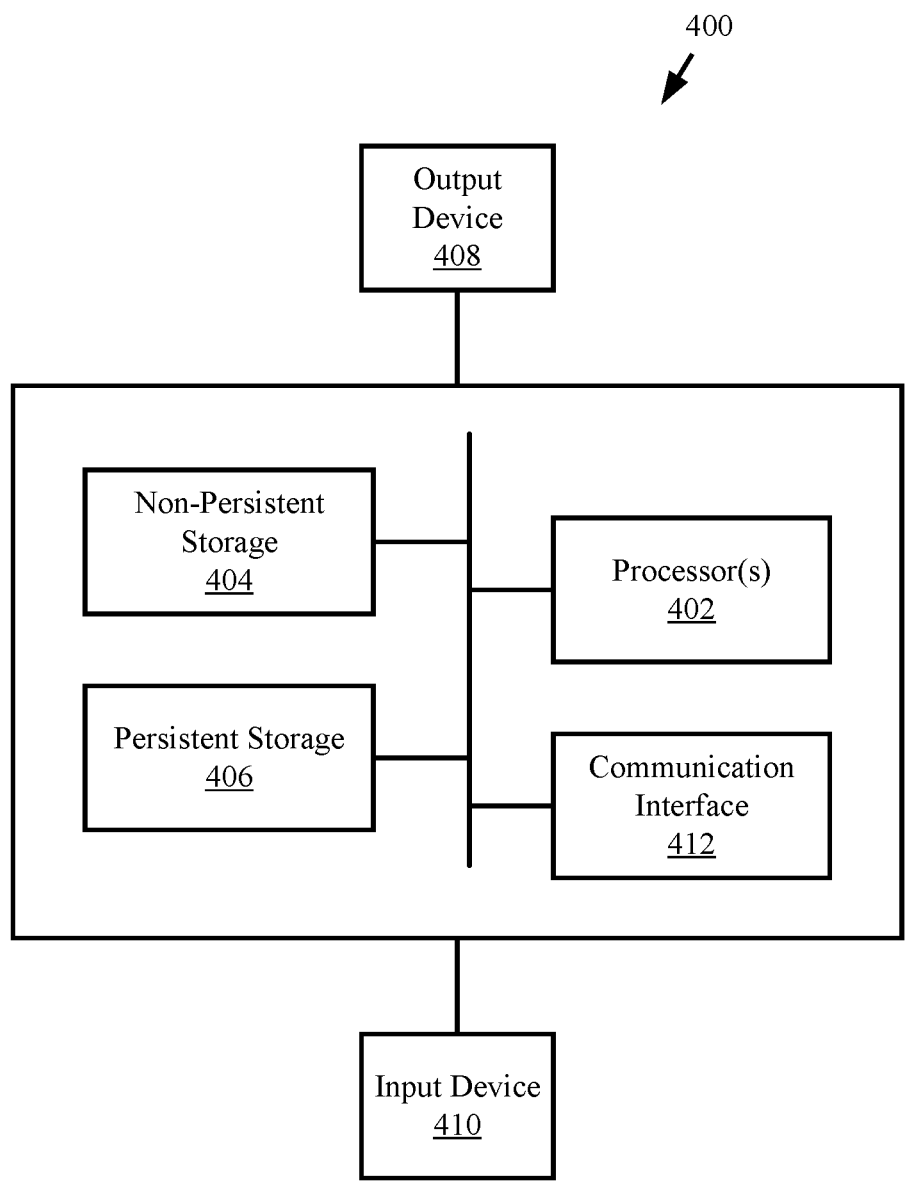
FIG. 4 shows a diagram of a computing device in accordance with one or more embodiments.

Turning now to FIG. 4. FIG. 4 shows a diagram of a computing device in accordance with one or more embodiments of the invention.

In one or more embodiments of the invention, the computing device (400) may include one or more computer processors (402), non-persistent storage (404) (e.g., volatile memory, such as RAM, cache memory), persistent storage (406) (e.g., a hard disk, an optical drive such as a CD drive or a DVD drive, a Flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) (402) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (e.g., a LAN, a WAN, Internet, mobile network, etc.) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices (408) may be the same or different from the input device(s) (410). The input and output device(s) (408, 410) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing a data migration operation, the method comprising:
   scanning a target device to determine user accounts on the target device;
   migrating data from a source device to the target device;
   monitoring user authentications of the user accounts on the target device while migrating data from the source device to the target device;
   making a determination that a number of user authentications made while migrating data exceeds a threshold value;
   stopping, based on the determination, migrating data from the source device to the target device;
   making a second determination, based on the scanning, that one of the user accounts is an unused user account;
   sending a notification to a user based on the second determination; and
   pausing initiation of the data migration operation based on the second determination.

2. The method of claim 1, further comprising:
   rolling back, based on the determination, data migrated from the source device to the target device during the data migration operation.

3. The method of claim 1, further comprising:
   receiving a second notification from the user that the unused user account is no longer a threat; and
   resuming initiation of the data migration operation based on the second notification.

4. The method of claim 1, further comprising:
   adjusting a security setting of the data before migrating the data from the source device to the target device.

5. The method of claim 4, wherein adjusting the security setting comprises applying a read and write lock on the data.

6. The method of claim 1, further comprising:
   reporting, to a user, a list of the user authentications made while migrating data from the source device to the target device.

7. The method of claim 1, further comprising:
   providing, to a learning model, a detail of each of the user authentications made while migrating data from the source device to the target device; and
   updating the learning model based at least in part on the detail, wherein the learning model is used, at least in part, in setting the threshold value.

8. A method for performing a data migration operation, the method comprising:
   scanning a target device to determine user accounts on the target device;
   migrating data from a source device to the target device;
   monitoring user authentications of the user accounts on the target device while migrating data from the source device to the target device to obtain user authentication information;
   making a determination that the user authentication information is indicative of suspicious activity;
   stopping, based on the determination, migrating data from the source device to the target device;
   making a second determination, based on the scanning, that one of the user accounts is an unused user account;
   sending a notification to a user based on the second determination; and
   pausing initiation of the data migration operation based on the second determination.

9. The method of claim 8, further comprising:
   rolling back, based on the determination, data migrated from the source device to the target device during the data migration operation.

10. The method of claim 8, further comprising:
    receiving a second notification from the user that the unused user account is no longer a threat; and
    resuming initiation of the data migration operation based on the second notification.

11. The method of claim 8, further comprising:
    adjusting a security setting of the data before migrating the data from the source device to the target device.

12. The method of claim 11, wherein adjusting the security setting comprises applying a read and write lock on the data.

13. The method of claim 8, further comprising:
    reporting, to a user, the user authentication information.

14. The method of claim 8, further comprising:
    providing, to a learning model, the user authentication information indicative of suspicious activity; and
    updating the learning model based at least in part on the user authentication information indicative of suspicious activity, wherein the learning model is used, at least in part, in making the determination.

15. A method for performing a data migration operation, the method comprising:
- migrating data from a source device to a target device, wherein the target device comprises user accounts;
- monitoring the target device while migrating data;
- making a determination, based on the monitoring, that suspicious activity has occurred on the target device;
- performing, based on the determination, an action from an action set;
- making a second determination that one of the user accounts is an unused user account;
- sending a notification to a user based on the second determination; and
- pausing initiation of the data migration operation based on the second determination.

16. The method of claim 15, wherein the action set comprising stopping migrating data from the source device to the target device, rolling back data migrated from the source device to the target device during the data migration operation, or both.

17. The method of claim 15, wherein the determination is based on a number of user authentications made on the target device while migrating data exceeding a threshold value.

18. The method of claim 15, further comprising:
- providing, to a learning model, information relating to the suspicious activity; and
- updating the learning model based at least in part on the information, wherein the learning model is used, at least in part, in making the determination.

* * * * *